US00RE50317E

(19) United States
(12) Reissued Patent
O'Connell et al.

(10) Patent Number: US RE50,317 E
(45) Date of Reissued Patent: Mar. 4, 2025

(54) CEILING FAN MOTOR HOUSING AND LIGHT KIT COMBINATION

(71) Applicant: Hunter Fan Company, Memphis, TN (US)

(72) Inventors: Patrick R. O'Connell, Germantown, TN (US); Christine Marie Holmes Bradley, Memphis, TN (US)

(73) Assignee: Hunter Fan Company, Memphis, TN (US)

(21) Appl. No.: 29/904,911

(22) Filed: Oct. 13, 2023

Related U.S. Patent Documents

Reissue of:
(64) Patent No.: Des. 904,597
Issued: Dec. 8, 2020
Appl. No.: 29/713,784
Filed: Nov. 19, 2019

U.S. Applications:
(62) Division of application No. 29/862,193, filed on Dec. 7, 2022, which is an application for the reissue of Pat.

(Continued)

(51) LOC (15) Cl. ..... 23-03
(52) U.S. Cl.
USPC ..... D23/411; D26/59
(58) Field of Classification Search
USPC ..... D23/370, 377, 379, 385, 411, 413; D26/59, 85, 86, 89

(Continued)

(56) References Cited

U.S. PATENT DOCUMENTS

D414,857 S 10/1999 Zuege
D420,120 S 2/2000 Evans (Continued)

OTHER PUBLICATIONS

"Loki 36 in. Integrated LED Indoor Polished Nickel Ceiling Fan with Light Kit." Home Depot., Jan. 24, 2019 [online], [retrieved on Mar. 30, 2024]. Retrieved from the Internet <URL: https://www.homedepot.com/p/Hunter-Loki-36-in-Integrated-LED-Indoor-Polished-Nickel-Ceiling-Fan-with-Light-Kit-59386/308143488>.*

(Continued)

*Primary Examiner* — Darlington Ly
(74) *Attorney, Agent, or Firm* — McGarry Bair PC

(57) CLAIM

The ornamental design for a ceiling fan motor housing and light kit combination, as shown and described.

DESCRIPTION

[FIG. 1 is a top perspective view of a ceiling fan motor housing and light kit combination shown in the environment of a ceiling fan, showing our new design;]
[FIG. 2 is a bottom perspective view thereof;]
[FIG. 3 is a top plan view of the motor housing and light kit combination, having the ceiling fan environment removed;]
[FIG. 4 is a bottom plan view thereof;]
[FIG. 5 is a front side view thereof; and,]
[FIG. 6 is a right side view thereof.]
*FIG. 7 is a top perspective view of a ceiling fan motor housing and light kit combination shown in the environment of a ceiling fan, showing our new design;*
*FIG. 8 is a bottom perspective view the ceiling fan motor housing and light kit combination of FIG. 7;*
*FIG. 9 is a top plan view of the motor housing and light kit combination of FIG. 7, having the ceiling fan environment removed;*
*FIG. 10 is a bottom plan view of the motor housing and light kit combination of FIG. 7;*
*FIG. 11 is a front side view of the motor housing and light kit combination of FIG. 7; and,*
*FIG. 12 is a right side view of the motor housing and light kit combination of FIG. 7.*

(Continued)

(New)

Portions of the ceiling fan environment and the ceiling fan motor housing and light kit combination are shown in broken lines. Portions shown in broken lines form no part of the claimed design.

1 Claim, 12 Drawing Sheets

Figure 1:
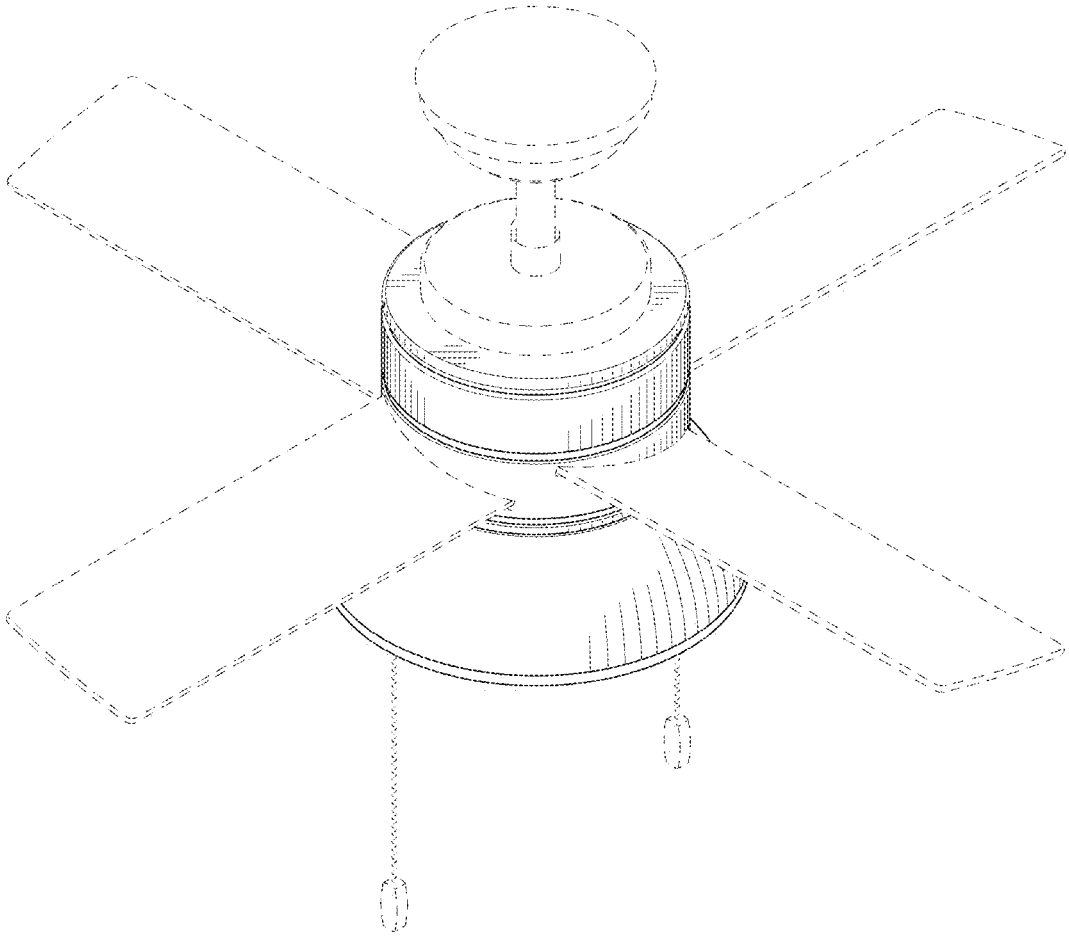
Figure 2:
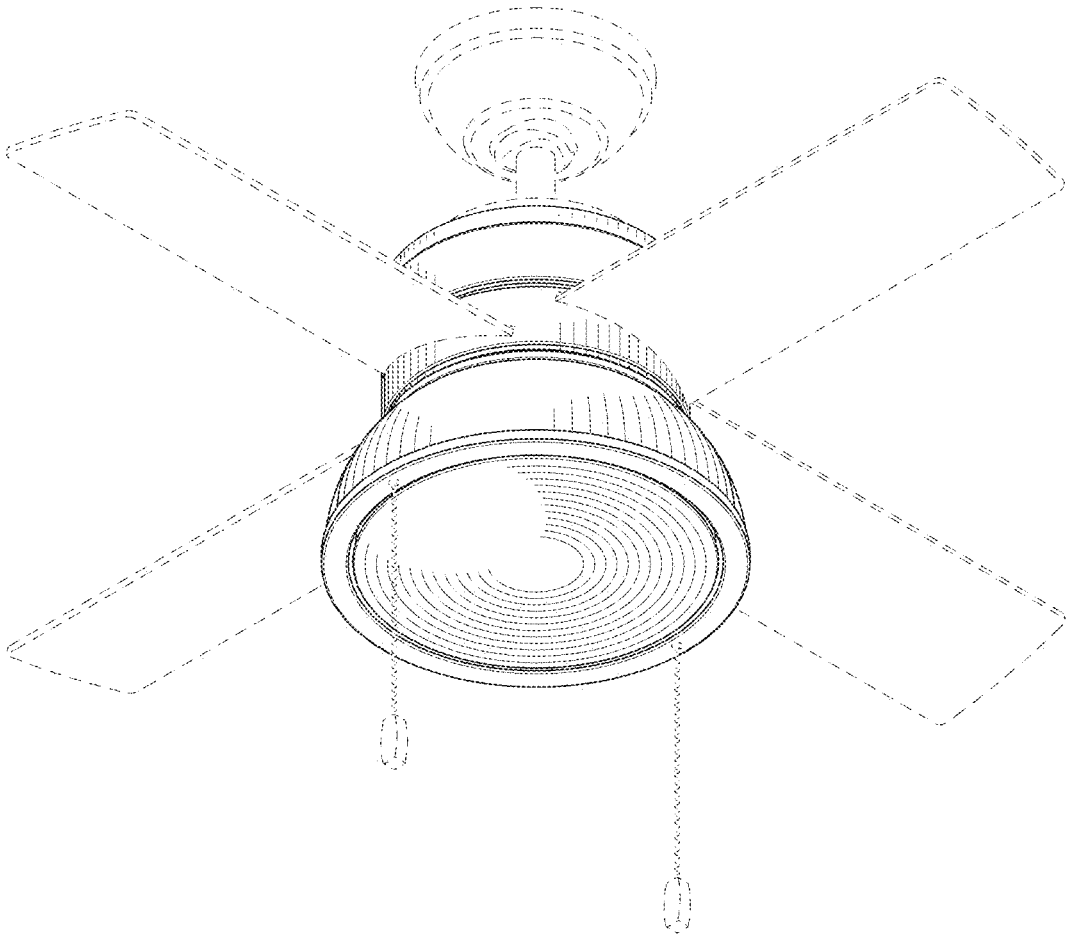
Figure 3:
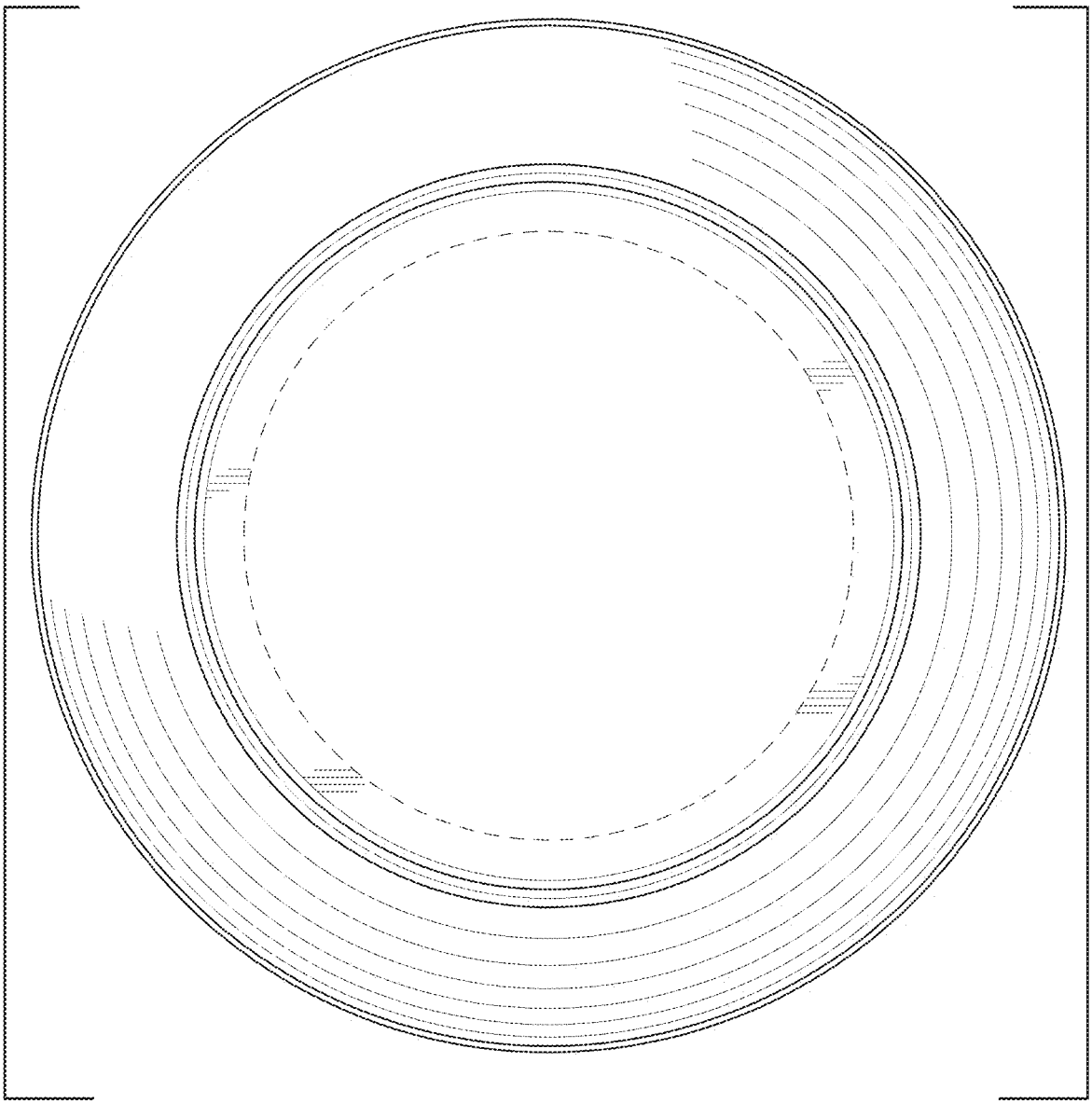
Figure 4:
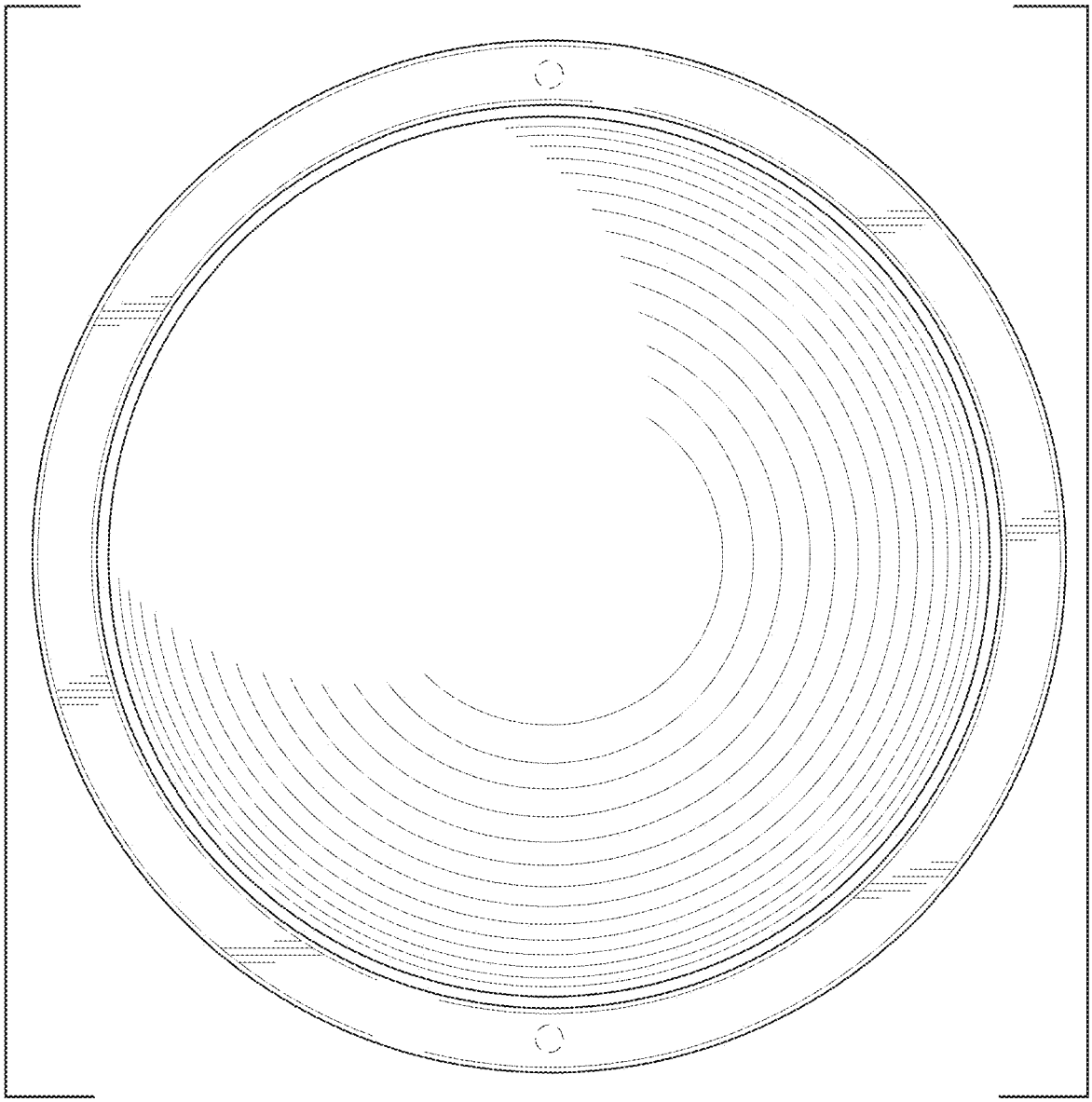
Figure 5:
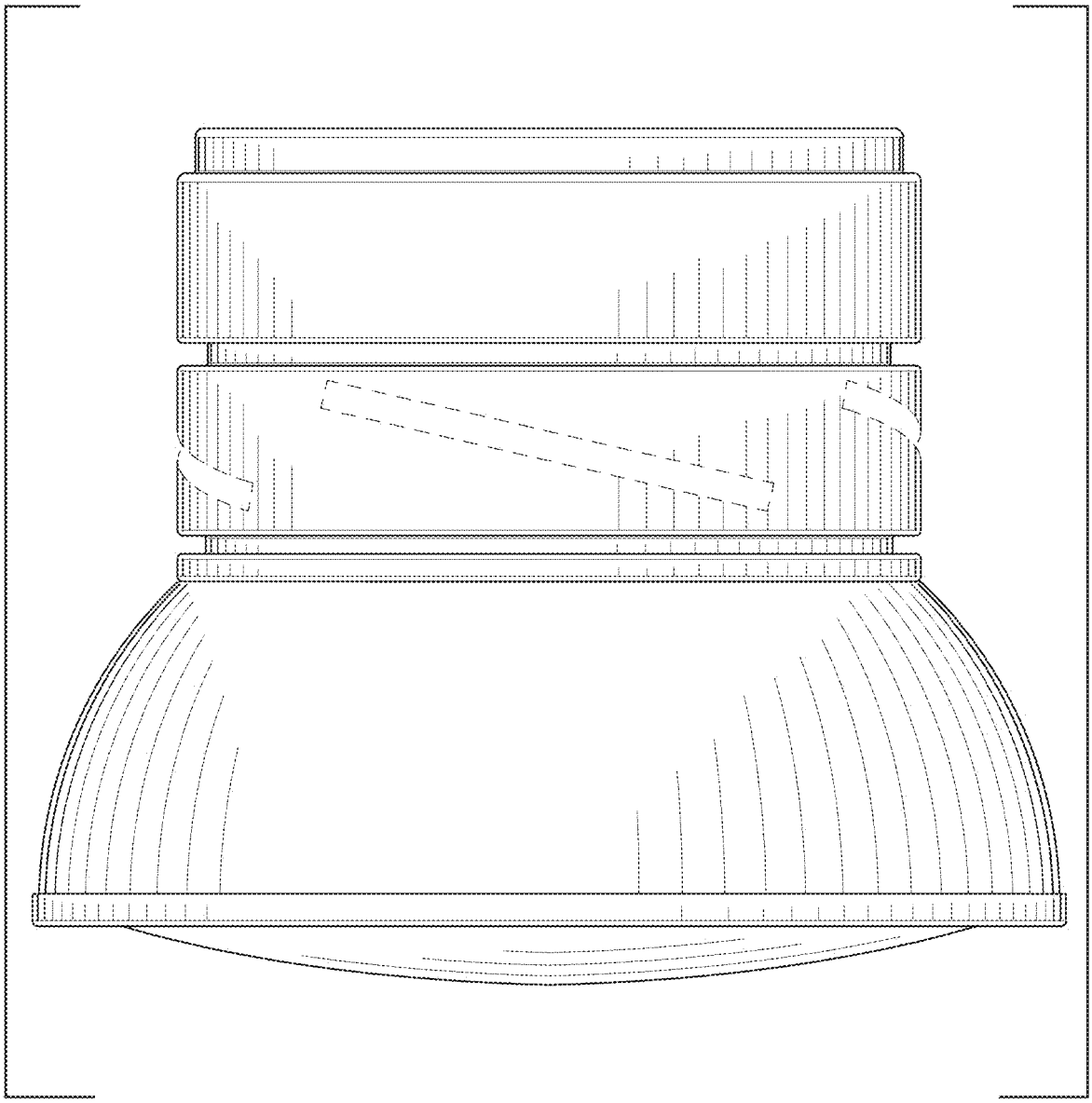
Figure 6:
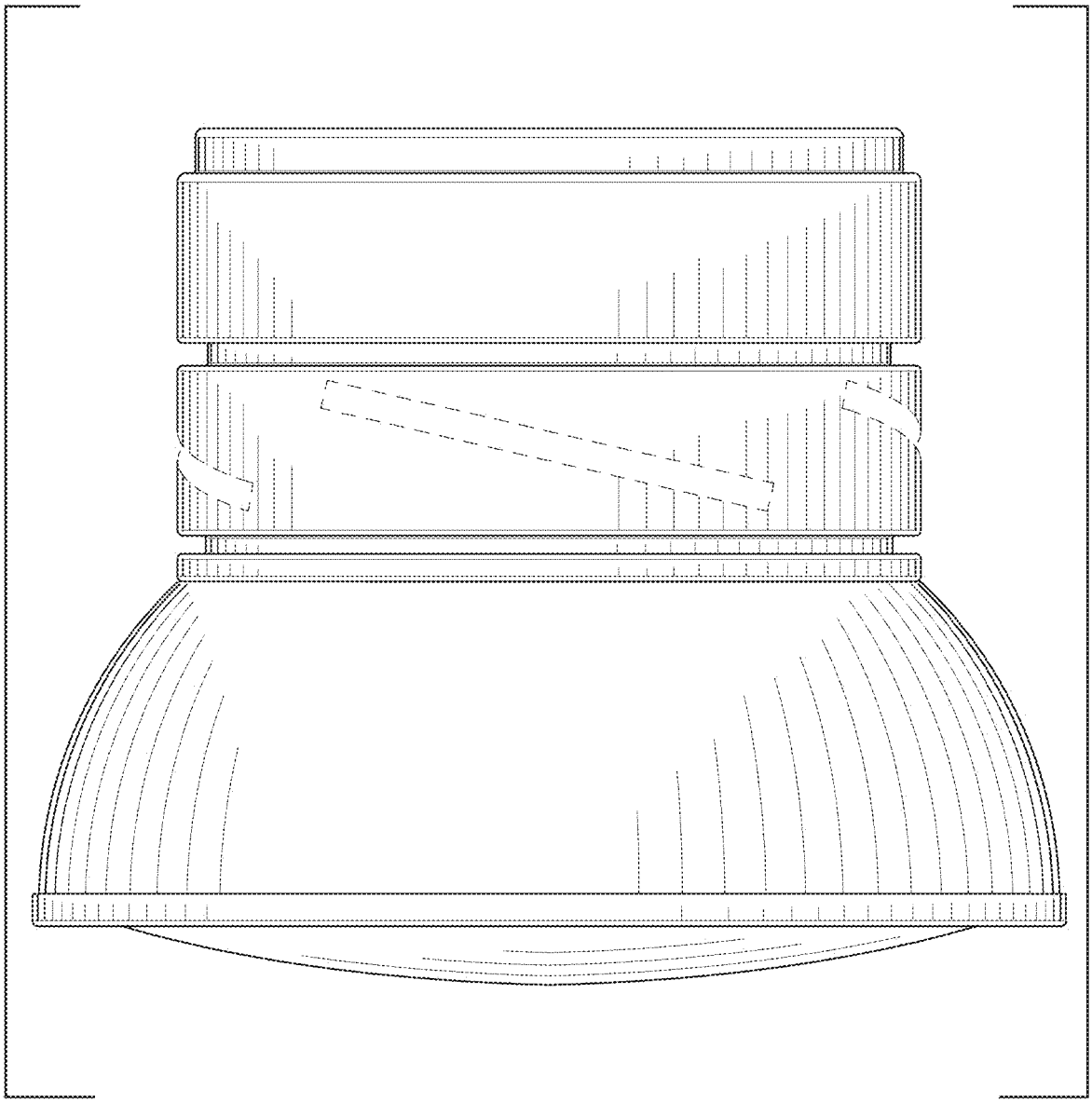

Matter enclosed in heavy brackets [ ] appears in the original patent but forms no part of this reissue; matter printed in italics indicates the additions made by reissue.

Related U.S. Application Data

No. Des. 904,597, which is a division of application No. 29/642,362, filed on Mar. 29, 2018, now Pat. No. Des. 888,221.

(58) Field of Classification Search
CPC ..... F04D 25/088; F04D 29/38; F04D 29/384; F04D 29/386; F21V 33/0096
See application file for complete search history.

(56) References Cited

U.S. PATENT DOCUMENTS

| | | | | | |
|---|---|---|---|---|---|
| D467,676 | S | * | 12/2002 | Packer | D26/72 |
| D488,554 | S | | 4/2004 | Bacon et al. | |
| D547,436 | S | | 7/2007 | Shurtleff | |
| D549,813 | S | | 8/2007 | Gajewski | |
| D557,787 | S | | 12/2007 | Gajewski | |
| D567,988 | S | | 4/2008 | Lissoni | |
| D592,792 | S | | 5/2009 | Keller | |
| D599,459 | S | | 9/2009 | Hidalgo | |
| D632,381 | S | | 2/2011 | Davenport et al. | |
| D632,384 | S | | 2/2011 | Pan | |
| D632,412 | S | | 2/2011 | Pan | |
| D633,455 | S | | 3/2011 | Chiu | |
| D633,611 | S | | 3/2011 | Pan | |
| D704,821 | S | | 5/2014 | Wang | |
| D751,187 | S | | 3/2016 | Dolan | |
| D760,368 | S | | 6/2016 | Chen | |
| D783,145 | S | | 4/2017 | Wang | |
| D798,431 | S | | 9/2017 | McRoberts | |
| D800,289 | S | | 10/2017 | Guthrie | |
| D804,633 | S | | 12/2017 | Holmes | |
| D807,488 | S | | 1/2018 | McRoberts | |
| D810,919 | S | | 2/2018 | Haggar | |
| D826,395 | S | | 8/2018 | McRoberts et al. | |
| D827,123 | S | | 8/2018 | Guthrie | |
| D831,268 | S | | 10/2018 | Johnson | |
| D838,357 | S | | 1/2019 | Haggar | |
| D850,606 | S | | 6/2019 | Wang | |
| D854,677 | S | | 7/2019 | Haggar | |
| D877,316 | S | * | 3/2020 | Wang | D23/411 |
| D904,597 | S | * | 12/2020 | O'Connell | D26/59 |
| D917,685 | S | * | 4/2021 | Jung | D23/364 |
| D920,499 | S | * | 5/2021 | Holmes | D26/59 |
| D921,880 | S | * | 6/2021 | Haggar | D23/377 |
| D933,193 | S | * | 10/2021 | Haggar | D26/59 |
| D933,806 | S | * | 10/2021 | Haggar | D23/377 |
| D936,813 | S | * | 11/2021 | McRoberts | D23/377 |
| 11,162,501 | B1 | * | 11/2021 | Dewitt | F04D 29/646 |
| D939,133 | S | * | 12/2021 | McRoberts | D26/118 |
| D948,700 | S | * | 4/2022 | McRoberts | D26/59 |
| D969,302 | S | * | 11/2022 | Eiffert | D23/411 |
| D972,711 | S | * | 12/2022 | Holmes Bradley | D23/411 |
| D989,273 | S | * | 6/2023 | Haggar | D23/413 |
| D989,275 | S | * | 6/2023 | Haggar | D23/413 |
| D991,435 | S | * | 7/2023 | McRoberts | D23/411 |
| 2005/0214145 | A1 | | 9/2005 | Grinbergs | |
| 2021/0099048 | A1 | * | 4/2021 | Lin | H02K 5/26 |

OTHER PUBLICATIONS

"The Hunter Loki 36 inch integrated LED noble bronze ceiling fan with light . . . " Home Depot., Feb. 7, 2019 [online], [retrieved on Mar. 30, 2024]. Retrieved from the Internet <URL: https://www.homedepot.com/p/Hunter-Loki-36-in-Integrated-LED-Indoor-Polished-Nickel-Ceiling-Fan-with-Light-Kit-59386/308143488#overlay>.*

"Hunter Fan 36 inch Modern Ceiling Fan with LED Light in Brushed Nickel (Renewed)." Amazon., Apr. 11, 2018 [online], [retrieved on Mar. 30, 2024]. Retrieved from the Internet <URL: https://www.amazon.com/Hunter-Fan-Ceiling-Certified-Refurbished/dp/B07C3YX3Q3>.*

"Hunter Fan Company 59387 Hunter 36" Loki LED Light Ceiling Fan, Noble Bronze Finish." Amazon., Dec. 7, 2018 [online], [retrieved on Mar. 30, 2024]. Retrieved from the Internet <URL: https://www.amazon.com/Hunter-Fan-Company-54152-Ceiling/dp/B07L6F9YDN?th=1>.* https://www.menards.com/main/lighting-ceiling-fans/ceiling-fans/indoor-ceiling-fans/turn-of-the-century-reg-alban-52-brushed-nickel-led-ceiling-fan/p-1473854532487-c-7488.htm?tid=8991733599029403053&ipos=12, Turn of the Century, Alban 52" Brushed Nickel LED Ceiling Fan, Model No. 20351, accessed Sep. 21, 2017.

http://www.montecarlofans.com/53867/57-Destin---Brushed-Steel-3DSTR57BSD.html, Monte Carlo Destin Collection, 57" Destin, Brushed Steel, Product No. 3DSTR57BSD, accessed Sep. 21, 2017.

http://www.minkagroup.net/products/f683l-gi, Fanimation Xeno Ceiling Fan, Model No. FP6728, accessed Sep. 21, 2017.

http://www.homedepot.com/p/Hampton-Bay-Marlton-52-in-Indoor-Liquid-Nickel-Ceiling-Fan-YG305-LN/202529593, Hampton Bay, Marlton 52 in. Indoor Liquid Nickel Ceiling Fan, Model No. YG0305-LN, accessed Sep. 21, 2017.

http://www.minkagroupnet/products/f5341-wh, Minka Group, LunAire 54" 5-Blade LED Ceiling Fan in White Finish with White Blades w/Etched Opal Glass, Model No. F534L-WH, accessed Sep. 21, 2017.

http://www.homedepot.com/p/Hampton-Bay-Merope-52-in-Satin-Nickel-Indoor-Ceiling-Fan-HE-12027/203838990, Hampton Bay, Merope 52 in. Satin Nickel Indoor Ceiling Fan, Model No. HE-12027, accessed Sep. 21, 2017.

http://www.hunterfan.com/Ceiling-Fans/Clanton?ModelNumber=59202, Minka Group, Shade 45" 4-Blade LED Ceiling Fan in Grey Iron Finish with Matte Black Blades w/Clear Fresnel Glass, Model No. F683L-GI, accessed Sep. 21, 2017.

http://www.fanimation.com/products/index.php/fans/xeno.html, Hunter Fan, Clanton 52" Ceiling Fan in Brushed Steel Finish, Model No. 59202, accessed Sep. 21, 2017.

* cited by examiner (Canceled)

(Canceled)

(Canceled)

(Canceled)

(Canceled)

(Canceled)

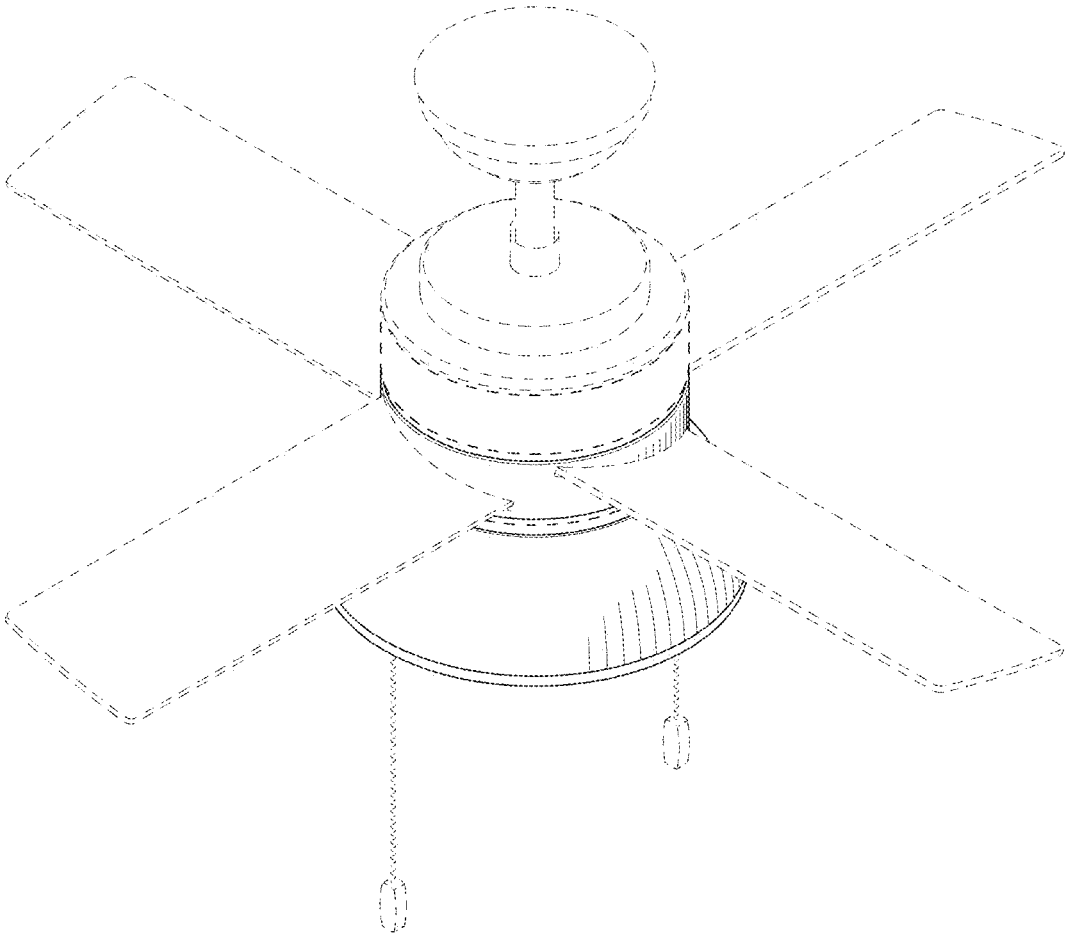
Fig.7
(New)

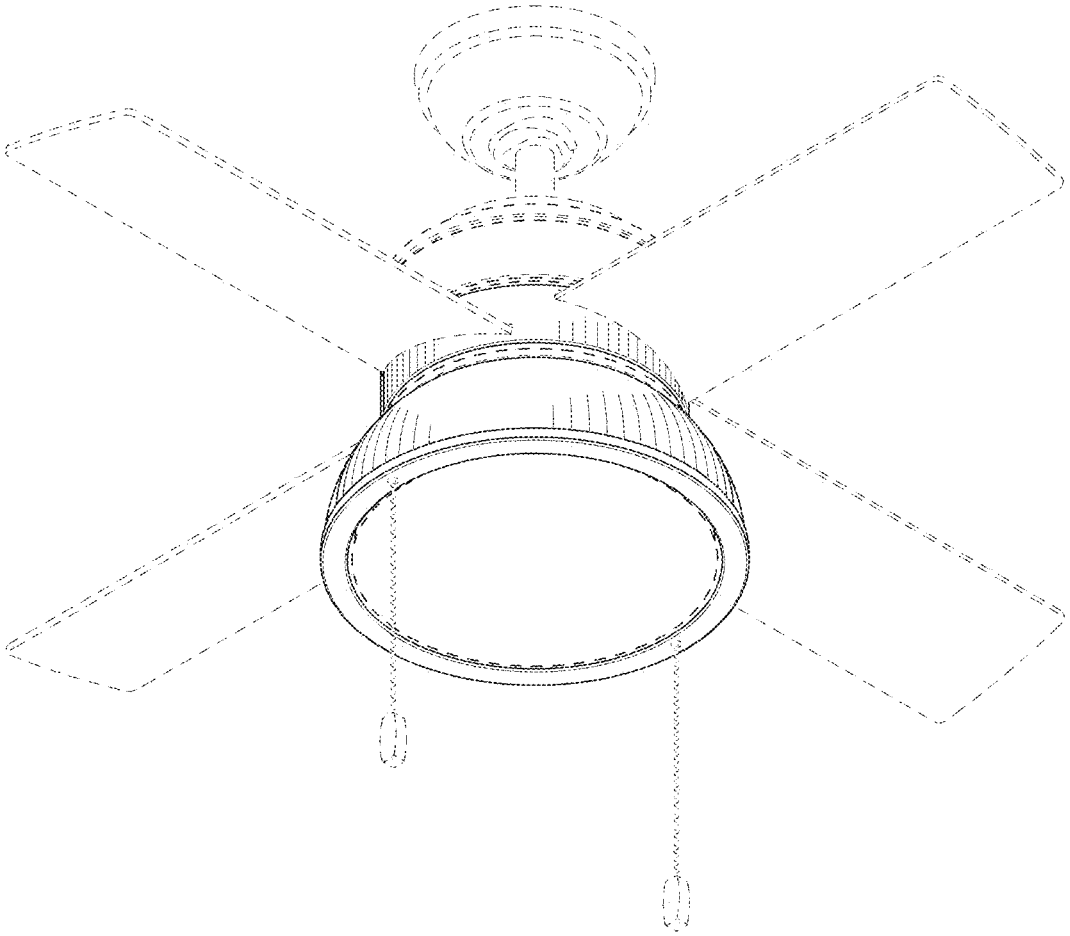
Fig.8
(New)

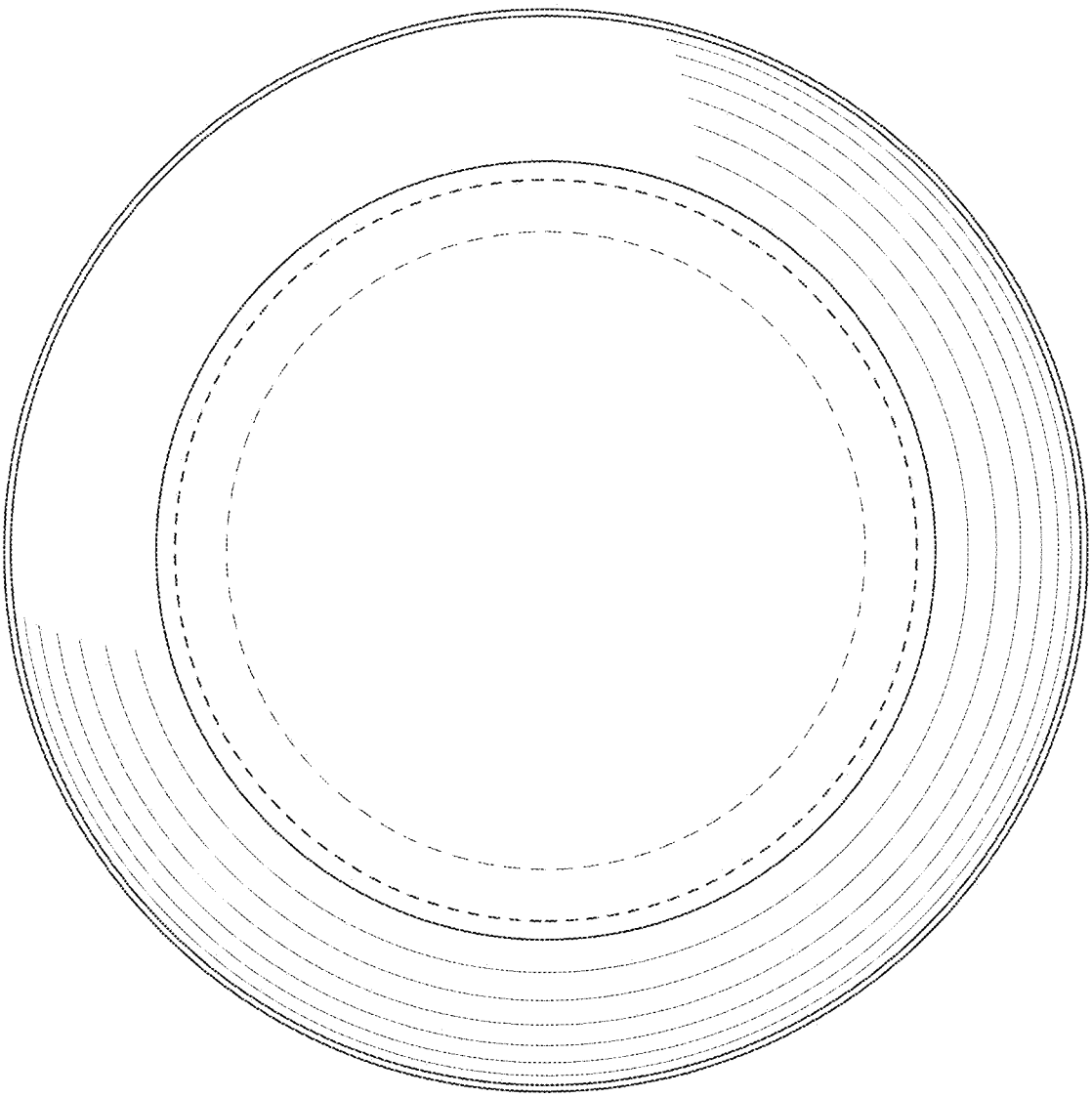
Fig.9
(New)

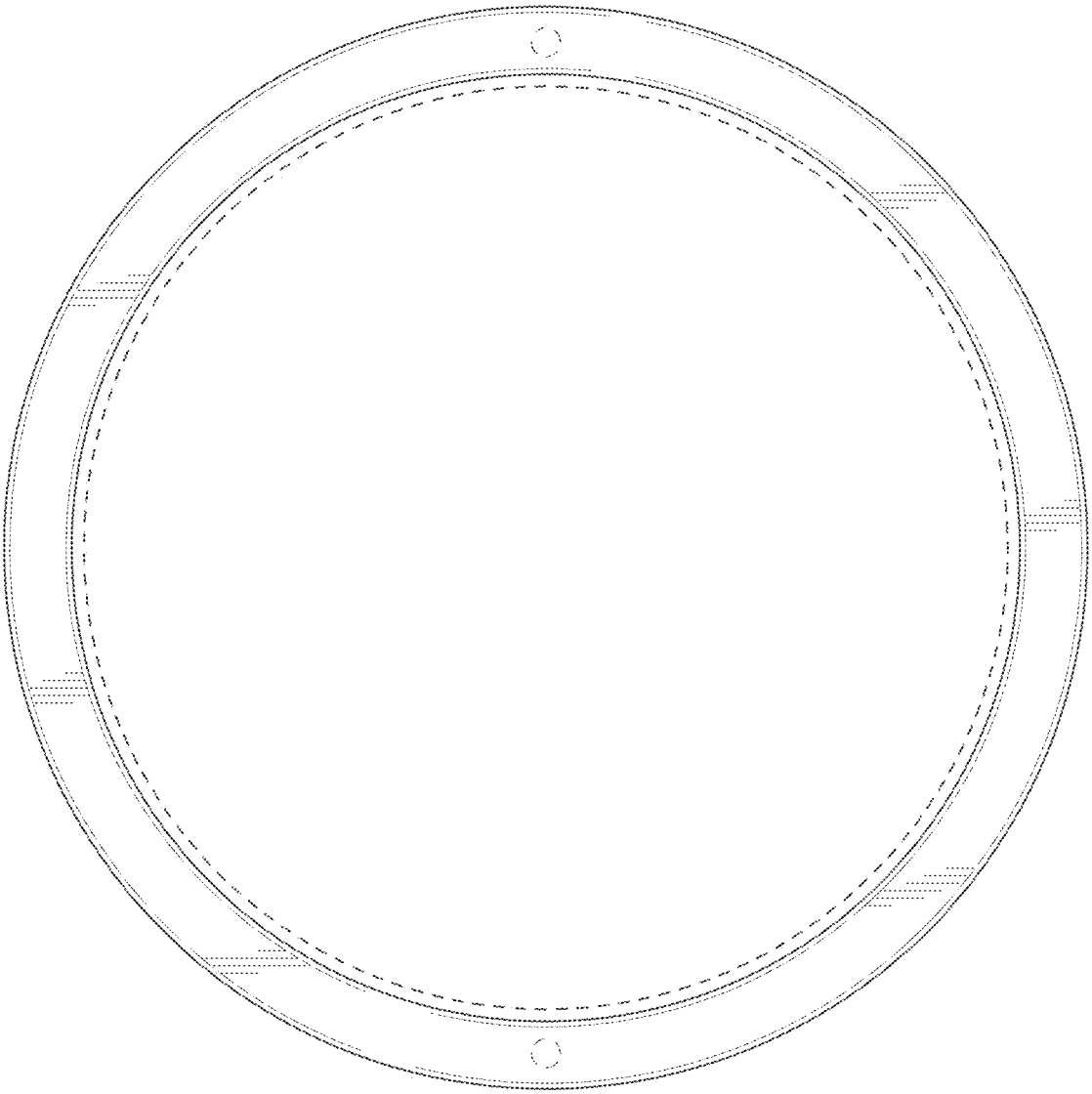
Fig.10
(New)

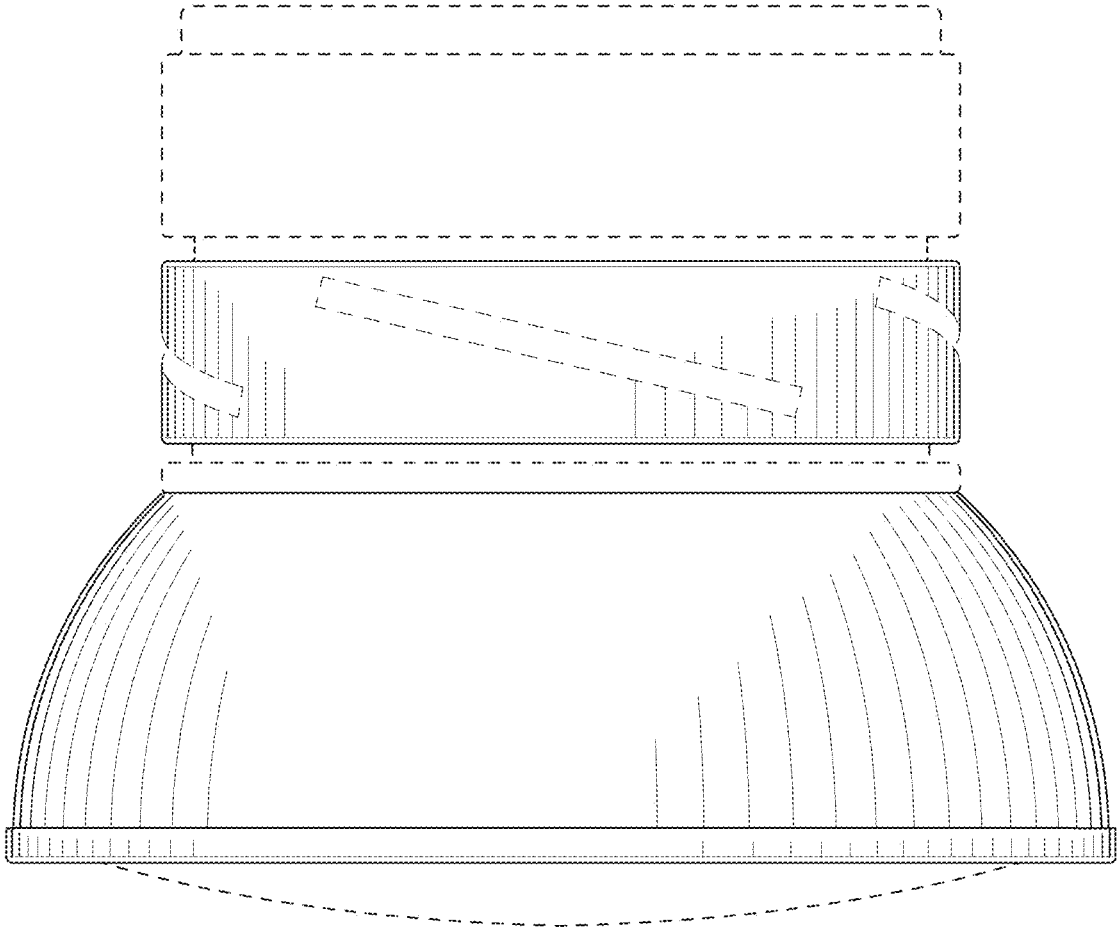
Fig.11
(New)

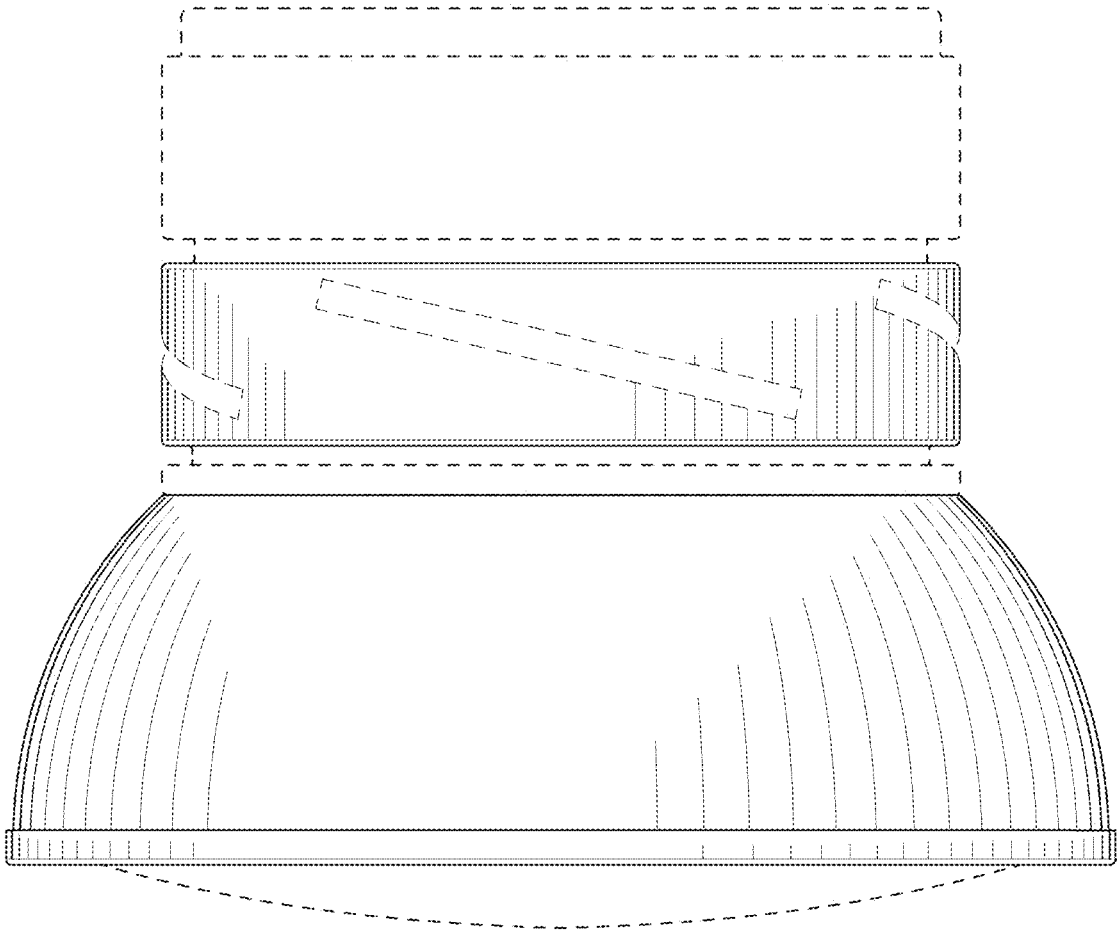
Fig.12
(New)